(12) United States Patent
Safai

(10) Patent No.: US 11,257,653 B2
(45) Date of Patent: Feb. 22, 2022

(54) INTEGRATED APERTURE SHIELD FOR X-RAY TUBES

(71) Applicant: The Boeing Company, Chicago, IL (US)

(72) Inventor: Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/833,297

(22) Filed: Mar. 27, 2020

(65) Prior Publication Data

US 2021/0305005 A1    Sep. 30, 2021

(51) Int. Cl.
| | |
|---|---|
| *H01J 35/16* | (2006.01) |
| *H01J 35/10* | (2006.01) |
| *G01N 23/203* | (2006.01) |
| *H01J 35/06* | (2006.01) |

(52) U.S. Cl.
CPC ............ *H01J 35/16* (2013.01); *G01N 23/203* (2013.01); *H01J 35/101* (2013.01); *H01J 35/064* (2019.05); *H01J 2235/162* (2013.01)

(58) Field of Classification Search
CPC ........ H01J 35/16; H01J 35/101; H01J 35/064; H01J 2235/162; G01N 23/203
See application file for complete search history.

(56) References Cited

U.S. PATENT DOCUMENTS

| | | |
|---|---|---|
| 4,277,684 A | 7/1981 | Carson |
| 4,698,835 A | 10/1987 | Ono et al. |
| 4,730,353 A | 3/1988 | Ono et al. |
| 4,870,671 A * | 9/1989 | Hershyn ................ H01J 35/112 378/124 |
| 5,625,661 A | 4/1997 | Oikawa |
| 8,855,268 B1 | 10/2014 | Safai et al. |
| 9,014,339 B2 | 4/2015 | Grodzins et al. |
| 9,020,103 B2 | 4/2015 | Grodzins |
| 9,052,271 B2 | 6/2015 | Grodzins et al. |
| 9,291,582 B2 | 3/2016 | Grodzins et al. |
| 9,355,810 B2 | 5/2016 | Chen et al. |
| 9,779,908 B2 | 10/2017 | Ding et al. |
| 10,535,491 B2 | 1/2020 | Rommel et al. |
| 10,541,061 B2 | 1/2020 | Wang |
| 10,762,998 B2 | 9/2020 | Rothschild |

(Continued)

FOREIGN PATENT DOCUMENTS

WO    WO-2019214674 A1 * 11/2019    ............. H01J 35/08

*Primary Examiner* — Chih-Cheng Kao
(74) *Attorney, Agent, or Firm* — Kunzler Bean & Adamson

(57) ABSTRACT

Disclosed herein is an x-ray backscatter apparatus ("apparatus") for non-destructive inspection of an object. The apparatus includes an x-ray emitter that includes a vacuum tube, an x-ray shield enclosed within the vacuum tube. The x-ray shield includes at least one emission aperture. The apparatus also includes a cathode enclosed within the vacuum tube and that is operable to generate an electron stream. Also included is an anode, enclosed within the vacuum tube and located relative to the cathode, to receive the electron stream and convert the electron stream from the cathode to an x-ray stream, and located relative to the emission aperture to direct at least a portion of the x-ray stream through the at least one emission aperture. Also disclosed are a system and a method that utilize the apparatus.

20 Claims, 5 Drawing Sheets

(56) References Cited

U.S. PATENT DOCUMENTS

| | | | |
|---|---|---|---|
| 2002/0085675 A1* | 7/2002 | Snyder | H01J 35/107 378/130 |
| 2005/0180542 A1* | 8/2005 | Leue | G01V 5/0016 378/57 |
| 2007/0172031 A1 | 7/2007 | Carson et al. | |
| 2007/0195938 A1* | 8/2007 | Bailey | A61B 6/501 378/198 |
| 2007/0269014 A1* | 11/2007 | Safai | H01J 35/10 378/143 |
| 2012/0106714 A1 | 5/2012 | Grodzins et al. | |
| 2012/0269319 A1 | 10/2012 | Grodzins et al. | |
| 2012/0321046 A1 | 12/2012 | Safai | |
| 2013/0195248 A1* | 8/2013 | Rothschild | G01V 5/0025 378/86 |
| 2014/0056412 A1 | 2/2014 | Chen et al. | |
| 2014/0064453 A1 | 3/2014 | Safai | |
| 2015/0173692 A1 | 6/2015 | Heuscher | |
| 2015/0371809 A1 | 12/2015 | Ding et al. | |
| 2017/0358380 A1 | 12/2017 | Rothschild | |
| 2018/0012724 A1 | 1/2018 | Rommel et al. | |
| 2019/0164717 A1 | 5/2019 | Bartzsch et al. | |
| 2020/0096457 A1 | 3/2020 | Safai | |

* cited by examiner

INTEGRATED APERTURE SHIELD FOR X-RAY TUBES

FIELD

This disclosure relates generally to x-ray backscatter inspection, and more particularly to x-ray backscatter inspection of parts using an integrated aperture shield.

BACKGROUND

Testing schemes, such as non-destructive testing, foreign object detection, non-line-of-site examination, etc., are frequently employed when destruction of the tested target is to be avoided. X-rays are frequently used to provide a penetrating scan or examination of a part. This testing is used in a variety of applications, some of which may include homeland security, oil and gas mining and refining, pipeline inspection, transportation, automotive, aerospace, marine, mining, shipping, and storage.

In some testing schemes, x-rays that pass through a part are detected. However, in other schemes, the x-rays reflected by the part are collected and used to produce images or analyses of the part. The pattern of the backscattered x-rays depends upon the materials and organization of the part and can, thereby, be used to determine a quality or characteristic of the part.

Traditionally, the quality of the image produced by backscatter detection corresponds to the power density of the x-rays when they meet the part to be inspected. More specifically, the higher the power density of the x-rays at impact with the part to be inspected, the higher the quality of the image. However, for conventional systems, in order to increase the power density of the x-rays, other factors, such as heat generation, energy consumption, system weight, and component and operating costs, must be increased as well. Accordingly, increasing the power density of x-rays at impact with a part, without unduly increasing other factors, is desirable.

SUMMARY

The subject matter of the present application has been developed in response to the present state of the art, and in particular, in response to the shortcomings of x-ray backscatter devices, that have not yet been fully solved by currently available techniques. Accordingly, the subject matter of the present application has been developed to provide an apparatus, system, and method that overcome at least some of the above-discussed shortcomings of prior art techniques. For example, the apparatus, system, and method described herein promotes improved x-ray imaging, improved image sharpness, reduced power supply requirement, reduced cooling requirement, longer run times, reduced system weight, reduced system size, improved portability, improved viability for a broader range of testing situations, and improved component life.

Disclosed herein is an x-ray backscatter apparatus for non-destructive inspection of a part. The x-ray backscatter apparatus comprises an x-ray emitter. The x-ray emitter comprises a vacuum tube. The x-ray emitter also comprises an x-ray shield that is enclosed within the vacuum tube and comprises at least one emission aperture. The x-ray emitter further comprises a cathode that is enclosed within the vacuum tube and is selectively operable to generate an electron stream. The x-ray emitter additionally comprises an anode that is enclosed within the vacuum tube and located relative to the cathode to receive the electron stream and convert the electron stream from the cathode to an x-ray stream. The anode is also located relative to the emission aperture to direct at least a portion of the x-ray stream through the at least one emission aperture. The preceding subject matter of this paragraph characterizes example 1 of the present disclosure.

The x-ray backscatter apparatus further comprises a rotatable anode shaft. The anode is co-rotatably coupled to the rotatable anode shaft and is rotatable about an axis. The preceding subject matter of this paragraph characterizes example 2 of the present disclosure, wherein example 2 also includes the subject matter according to example 1, above.

The x-ray shield comprises a cylinder having a first end and a second end. The cylinder is disposed around the anode. The first end comprises an opening for receiving the electron stream from the cathode. The preceding subject matter of this paragraph characterizes example 3 of the present disclosure, wherein example 3 also includes the subject matter according to example 2, above.

The x-ray shield is coupled to the rotatable anode shaft. The preceding subject matter of this paragraph characterizes example 4 of the present disclosure, wherein example 4 also includes the subject matter according to example 3, above.

The x-ray shield and the anode are co-rotatable about an axis. The preceding subject matter of this paragraph characterizes example 5 of the present disclosure, wherein example 5 also includes the subject matter according to example 4, above.

The x-ray shield is rotatable about an axis at a first speed and the anode is rotatable about the axis at a second speed. The preceding subject matter of this paragraph characterizes example 6 of the present disclosure, wherein example 6 also includes the subject matter according to example 4, above.

The x-ray backscatter apparatus further comprises a controller configured to control a first motor to rotate the x-ray shield at the first speed and control a second motor to rotate the anode at the second speed. The preceding subject matter of this paragraph characterizes example 7 of the present disclosure, wherein example 7 also includes the subject matter according to example 6, above.

The x-ray shield is thermally coupled to the anode and configured to absorb heat directly from the anode. The preceding subject matter of this paragraph characterizes example 8 of the present disclosure, wherein example 8 also includes the subject matter according to any one of examples 3-7, above.

The at least the portion of the x-ray stream that passes through the at least one emission aperture is a collimated x-ray beam that travels towards a location on a surface of an object. A portion of the collimated x-ray beam is reflected off of the surface of the object and detected by a detector. The preceding subject matter of this paragraph characterizes example 9 of the present disclosure, wherein example 9 also includes the subject matter according to any one of examples 1-8, above.

The x-ray stream has an energy level between approximately 60 keV and approximately 220 keV. The preceding subject matter of this paragraph characterizes example 10 of the present disclosure, wherein example 10 also includes the subject matter according to any one of examples 1-9, above.

Further disclosed herein is an x-ray backscatter system for non-destructive inspection of a part. The x-ray backscatter system comprises a base. The x-ray backscatter system also comprises an x-ray emitter coupled to the base. The x-ray emitter comprises a rotatable anode and a rotatable x-ray shield enclosed within a vacuum tube. The rotatable x-ray shield comprises at least one emission aperture and is disposed around a rotatable anode. The x-ray backscatter system further comprises a detector coupled to the base, the detector configured to detect at least a portion of x-ray beams from the x-ray emitter that pass through the at least one emission aperture and reflect off of a surface of an object. The preceding subject matter of this paragraph characterizes example 11 of the present disclosure.

The rotatable x-ray shield is thermally coupled to the rotatable anode and configured to directly absorb heat from the rotatable anode. The preceding subject matter of this paragraph characterizes example 12 of the present disclosure, wherein example 12 also includes the subject matter according to example 11, above.

The base comprises a mobility system operable to move the base relative to the object. The preceding subject matter of this paragraph characterizes example 13 of the present disclosure, wherein example 13 also includes the subject matter according to any one of examples 11-12, above.

The mobility system comprises one or more of a wheel, a tread, a skid, a track, a roller, a cable, a pulley, a magnet, a motor, a slide, and a bearing. The preceding subject matter of this paragraph characterizes example 14 of the present disclosure, wherein example 14 also includes the subject matter according to example 13, above.

The rotatable x-ray shield comprises a cylinder having a first end and a second end. The cylinder is disposed around the rotatable anode. The first end comprises an opening for receiving an electron stream from a cathode enclosed within the vacuum tube. The preceding subject matter of this paragraph characterizes example 15 of the present disclosure, wherein example 15 also includes the subject matter according to any one of examples 11-14, above.

The rotatable x-ray shield and the rotatable anode are co-rotatable about an axis. The preceding subject matter of this paragraph characterizes example 16 of the present disclosure, wherein example 16 also includes the subject matter according to any one of examples 11-15, above.

The rotatable x-ray shield is rotatable about an axis at a first speed and the rotatable anode is rotatable about the axis at a second speed. The preceding subject matter of this paragraph characterizes example 17 of the present disclosure, wherein example 17 also includes the subject matter according to any one of examples 11-15, above.

Additionally disclosed herein is a method of non-destructive inspection of a part by x-ray backscatter. The method comprises receiving, at a rotatable anode within a vacuum tube, an electron stream from a cathode and converting the electron stream into an x-ray stream. The method also comprises passing, through an aperture in a rotatable x-ray shield enclosed within the vacuum tube, at least a portion of the x-ray stream as a collimated x-ray beam that travels towards a location on a surface of an object. The method further comprises detecting, at a detector, a portion of the collimated x-ray beam that is reflected off of the surface of the object. The preceding subject matter of this paragraph characterizes example 18 of the present disclosure.

The method further comprises co-rotating the rotatable anode and the rotatable x-ray shield. The preceding subject matter of this paragraph characterizes example 19 of the present disclosure, wherein example 19 also includes the subject matter according to example 18, above.

The method further comprises rotating the rotatable x-ray shield at a first speed and the rotatable anode at a second speed. The preceding subject matter of this paragraph characterizes example 20 of the present disclosure, wherein example 20 also includes the subject matter according to example 18, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
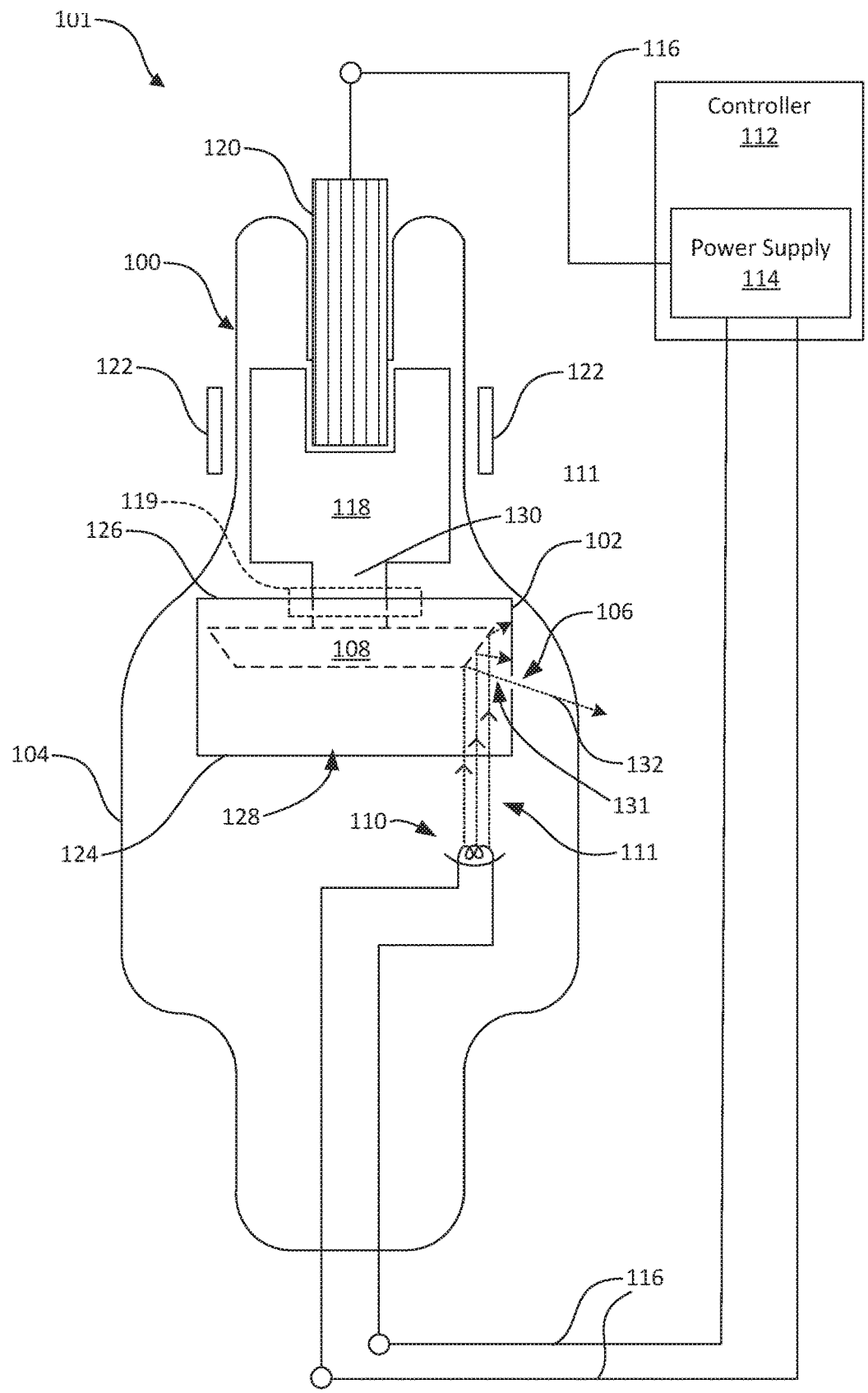
FIG. 1 is a schematic view of an apparatus that comprises an x-ray emitter, according to one or more examples of the subject disclosure.

Referring to FIG. 1, a side-view diagram illustrates an x-ray backscatter apparatus 101, which includes an x-ray emitter 100, according to examples of the subject disclosure. The x-ray emitter 100 includes an x-ray shield 102 disposed within a vacuum tube 104. The x-ray shield 102 includes an emission aperture 106. The x-ray shield 102, in certain examples, encircles an anode 108. The vacuum tube 104 encloses a cathode 110, the anode 108, and the x-ray shield 102. The cathode 110 and the anode 108 are connected to a controller 112 of the apparatus 101. The controller 112 includes a power supply 114 that is electrically coupled to the cathode 110 via leads 116 of the apparatus 101. The cathode 110 includes a filament that is electrically connected to the leads 116. The cathode 110 is selectively operable to generate an electron stream 111, in response to receipt of electrical energy from the power supply 114 via the leads 116, which is received at the anode 108.

In certain examples, the anode 108 receives the electron stream 111 and generates an x-ray stream 131. The x-ray stream 131 is directed from the anode 108 outwards towards the x-ray shield 102. A portion (i.e., a collimated x-ray beam 132) of the x-ray stream 131 from the anode 108 passes through the emission aperture 106, while the rest of the x-ray stream 131 is blocked by the x-ray shield 102. In the illustrated example of the x-ray emitter 100, the anode 108 is a rotating anode. In certain examples, the anode 108 is a tungsten anode coupled to a motor 118. The motor 118 is supported by a motor support 120. The motor 118, in certain examples, is coupled to the motor support 120 with bearings or other structures. The motor 118 is driven, in certain examples, by motor windings 122. A magnetic field created by applying an electrical signal to the windings 122 applies a force to the motor 118 to turn the motor 118 and the anode 108.

In certain examples, the x-ray shield 102 is a partial cylinder shape configured to encircle the anode 108. The x-ray shield 102 includes a first end 124 and a second end 126 that is opposite the first end. The first end 124 is an open end that defines an opening 128, which is open to, or oriented towards, the cathode 110 to receive the electron stream 111 from the cathode 110. The second end 126 is a closed end. Accordingly, the x-ray shield 102 is open at the first end 124, closed at the second end 126, and, in certain examples, resembles a cup. The second end 126 of the x-ray shield 102 is coupled, in certain examples, to an anode shaft 130 that is rotatable via operation of the motor 118. Accordingly, as used herein, a partial cylinder shape is a hollow cylinder (e.g., tube) with an open end and a closed end that is opposite the open end.

Moreover, the anode 108 is co-rotatably coupled to the anode shaft 130 such that the anode 108 co-rotates with the anode shaft 130 via operation of the motor 118. In certain examples, the x-ray shield 102 is co-rotatably coupled to the anode shaft 130 such that the x-ray shield 102 co-rotates with the anode shaft 130 and the anode 108. In other words, in some examples, the x-ray shield 102 is configured to rotate at the same speed as the anode 108. In other examples, the x-ray shield 102 is rotatably coupled to the anode shaft 130 such that the x-ray shield 102 rotates relative to the anode shaft 130 and the anode 108. In other words, in certain examples, the x-ray shield 102 is configured to rotate at a first speed relative to the anode 108, which rotates at a second speed, as directed by the controller 112. Both of the first speed and the second speed, in certain examples, are variable. Rotative coupling between the x-ray shield 102 and the anode shaft 130 is facilitated by a second motor 119, such as a rotary motor, fixed to the anode shaft 130 in some examples. In certain examples, the x-ray shield 102 is thermally coupled to the anode 108 and configured to act as a heat sink for the anode 108 and to directly absorb heat generated by the anode 108. For example, the x-ray shield 102 receives heat directly from the anode 108 via conduction.

The x-ray stream 131 generated by the anode 108 is generally directed radially outward from the anode 108 in a cone-shaped pattern. Beneficially, however, the x-ray shield 102 is configured to absorb the bulk of the x-ray stream 131. As mentioned above, a portion of the x-ray stream 131 that passes through the emission aperture 106 passes as the collimated x-ray beam 132. Positioning the x-ray shield 102 inside the vacuum tube 103, and thermally coupling the x-ray shield 102 to the anode 108, provides numerous advantages, some of which include improved x-ray imaging, larger field of view, larger inspection angle, improved image resolution, improved image sharpness, reduced number of required transverse scans, dynamic and instantaneous field of view, reduced image distortion, reduced pin-cushion effect at imaging corners, reduced power supply requirement, reduced cooling requirement, longer run times, reduced system weight, reduced system size, improved portability, improved viability for a broader range of testing situations, and improved component life. The ability to rotate the x-ray shield 102, by the controller 112, at a different speed than the anode 108 also provides numerous advantages, including but not limited to, improved image sharpness, reduced image distortion, etc., because the collimated x-ray beam 132 is directable at faster or slower speeds depending on the desired application.

Figure 2:
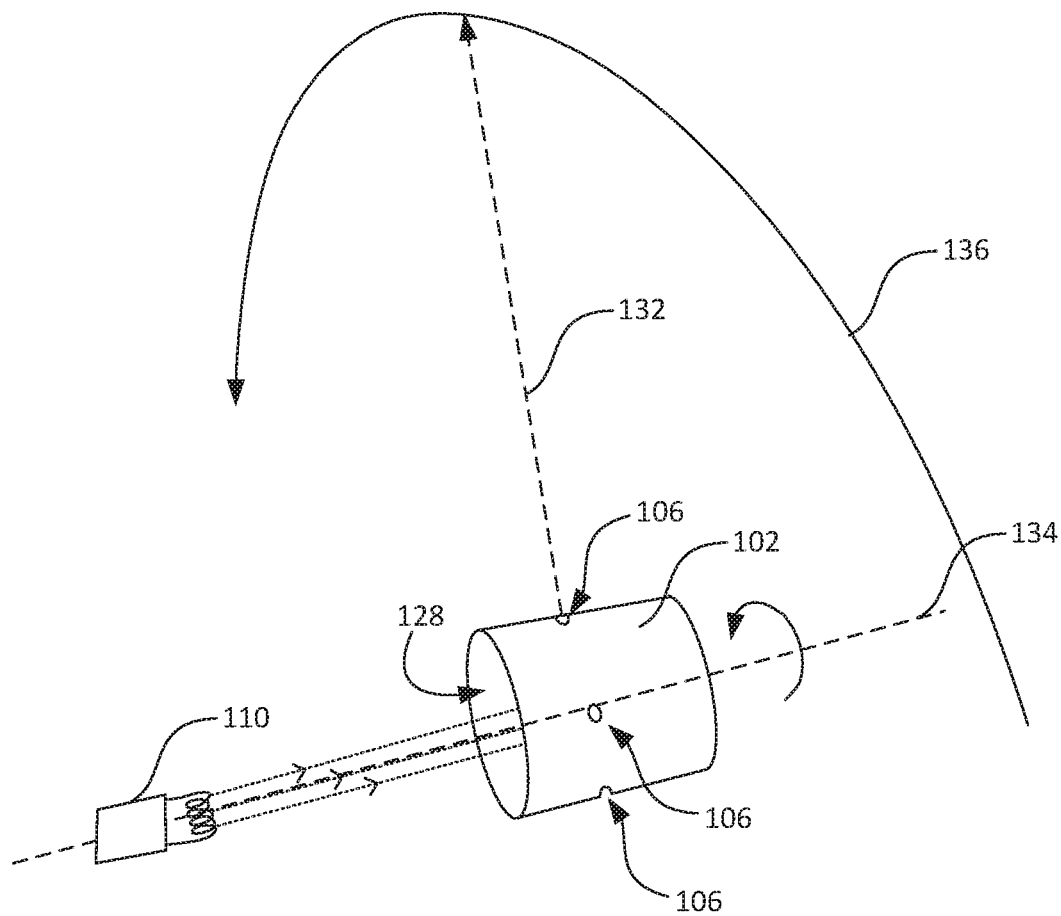
FIG. 2 is a perspective view diagram of an x-ray shield, according to examples of the subject disclosure.

Referring to FIG. 2, a simplified schematic view of the x-ray shield 102 according to various examples of the subject disclosure. The x-ray shield 102 is configured to rotate about an axis 134. The axis 134 is the same axis about which the anode 108 rotates. The x-ray shield 102 is driven by the motor 118, in some examples, as disclosed above. The x-ray shield 102 is configured with one or more emission apertures 106. The emission apertures 106 are positionable according to the type of testing application. For example, backscatter scanning of certain objects benefit from emission apertures 106 positioned at 30 degree intervals, while other objects benefit from emission apertures 106 positioned at 90 degree intervals, as depicted.

Electron energy from the cathode 110 is directed into the x-ray shield 102 through the opening 128 onto the anode 108 (not shown in FIG. 2) within the x-ray shield 102. To generate the electron stream 111, electrons are boiled off the cathode 110 by means of thermo-ionic-emission, and are collided with the anode 108 under a high energy electric field. X-rays are produced when the electrons are suddenly decelerated upon collision with the anode 108. If the bombarding electrons have sufficient energy, they can knock an electron out of an inner shell of the target metal atoms. Then, electrons from higher states drop down to fill the vacancy, emitting x-ray photons with precise energies determined by the electron energy levels of the anode material 108 and generating the x-ray stream 131. The stream is radially symmetric within a circular fan or cone of x-rays. The x-ray stream 131 is largely absorbed by the x-ray shield 102. A portion passes through the emission aperture 106 as the collimated x-ray beam 132. As the x-ray shield 102 rotates within the vacuum tube 104, the collimated x-ray beam 132 traces a path 136 defined by the orientation of the x-ray emitter 100 and the emission aperture 106.

Figure 3:
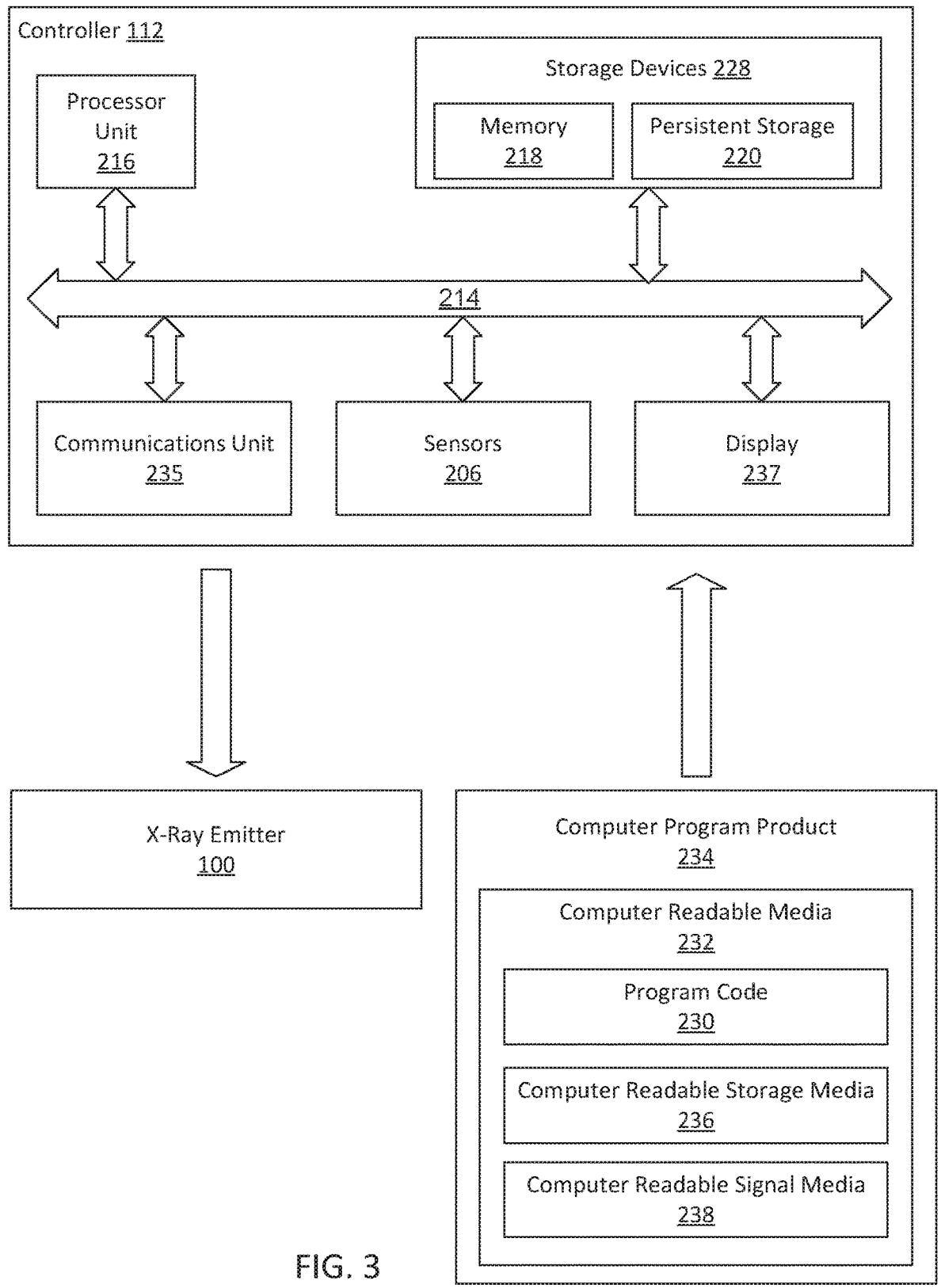
FIG. 3 is a schematic block diagram of a controller, according to examples of the subject disclosure.

FIG. 3 is a schematic block diagram illustrating the controller 112 of the apparatus 101, according to examples of the subject disclosure. The controller 112 is an example of a computing device, which, in some examples, is used to implement one or more components of examples of the disclosure, and in which computer usable program code or instructions implementing the processes can be located for the illustrative examples. In this illustrative example, the controller includes a communications fabric 214, which provides communications between a processor unit 216, memory 218, sensors 206 (e.g., temperature sensors and optical sensors), persistent storage 220, a communications unit 235, and a display 237. The sensor 206, in certain examples, is the x-ray detector that captures reflected x-rays from the surface of an object.

The processor unit 216 serves to execute instructions for software that are loaded into the local memory 218 in some examples. In one example, the processor unit 216 is a set of one or more processors or can be a multi-processor core, depending on the particular implementation. Further, the processor unit 216 is implemented using one or more heterogeneous processor systems, in which a main processor is present with secondary processors on a single chip, according to some examples. As another illustrative example, the processor unit 216 is a symmetric multi-processor system containing multiple processors of the same type.

Memory 218 and persistent storage 220 are examples of storage devices 228. A storage device is any piece of hardware that is capable of storing information, such as, for example, without limitation, data, program code in functional form, and/or other suitable information either on a temporary basis and/or a permanent basis. Memory 218, in these examples, is a random-access memory, or any other suitable volatile or non-volatile storage device. Persistent storage 220 takes various forms, depending on the particular implementation. In one example, persistent storage 220 contains one or more components or devices. In an example, persistent storage 220 is a hard drive, a flash memory, a rewritable optical disk, a rewritable magnetic tape, or some combination of the above. The media used by persistent storage 220 is removable in some examples. For example, a removable hard drive is used for persistent storage 220 in various implementations.

The communications unit 235, in these examples, provides for communication with other data processing systems or devices. In these examples, the communications unit 235 is a network interface card. The communications unit 235 provides communications through the use of either, or both, physical and wireless communications links. In some examples, the communication unit 235 also provides a connection for user input through a keyboard, a mouse, and/or some other suitable input device. Further, the input/output unit sends output to a printer or receive input from any other peripheral device in various examples. The display 237 provides a mechanism to display information to a user.

In some examples, instructions for the operating system, applications, and/or programs are located in the storage devices 228, which are in communication with the processor unit 216 through the communications fabric 214. In these illustrative examples, the instructions are in a functional form on persistent storage 220. These instructions are loaded into memory 218 for execution by the processor unit 216 in some examples. In certain examples, the processes of the different examples are performed by the processor unit 216 using computer implemented instructions, which is located in a memory, such as the memory 218.

These instructions are referred to as program code, computer usable program code, or computer readable program code that can be read and executed by a processor in the processor unit 216. The program code, in the different examples, is embodied on different physical or computer readable storage media, such as the memory 218 or the persistent storage 220.

Program code 230 is located in a functional form on computer readable media 232 that is selectively removable and can be loaded onto or transferred to the controller 112 for execution by the processor unit 216. In some examples, the program code also contains the curing plan discussed above. The program code 230 and computer readable media 232 form computer program product 234. In one example, the computer readable media 232 is a computer readable storage media 236 or a computer readable signal media 238. The computer readable storage media 236 includes, in one example, an optical or magnetic disc that is inserted or placed into a drive or other device that is part of the persistent storage 220 for transfer onto a storage device, such as a hard drive, that is part of the persistent storage 220. In other examples, the computer readable storage media 236 also takes the form of a persistent storage, such as a hard drive, a thumb drive, or a flash memory that is connected to the controller 112. In some instances, the computer readable storage media 236 is not removable from the controller 112.

Alternatively, the program code 230 is transferred to the controller 112 using computer readable signal media 238. Computer readable signal media 238 is, as one example, a propagated data signal containing program code 230. For example, the computer readable signal media 238 is an electromagnetic signal, an optical signal, and/or any other suitable type of signal in one example. These signals are transmitted over communications links, such as wireless communication links, an optical fiber cable, a coaxial cable, a wire, and/or any other suitable type of communications link. In other words, the communications link and/or the connection is physical or wireless in the illustrative examples. The computer readable media also takes the form of non-tangible media, such as communications links or wireless transmissions containing the program code, in some examples.

In some illustrative examples, the program code 230 is downloaded over a network to the persistent storage 220 from another device or data processing system through the computer readable signal media 238 for use within the controller 112. In one instance, program code stored in a computer readable storage media in a server data processing system is downloaded over a network from a server to the controller 112. According to various examples, the system providing the program code 230 is a server computer, a client computer, or some other device capable of storing and transmitting program code 230.

The different components illustrated for the controller 112 are not meant to provide physical or architectural limitations to the manner in which different examples can be implemented. The different illustrative examples can be implemented in a controller including components in addition to and/or in place of those illustrated for the controller 112. Other components shown in FIG. 3 can be varied from the illustrative examples shown. The different examples can be implemented using any hardware device or system capable of executing program code. For example, a storage device in the controller 112 is any hardware apparatus that can store data. The memory 218, persistent storage 220, and the computer readable media 232 are examples of storage devices in a tangible form.

In another example, a bus system is used to implement communications fabric 214 and can be comprised of one or more buses, such as a system bus or an input/output bus. Of course, in some examples, the bus system is implemented using any suitable type of architecture that provides for a transfer of data between different components or devices attached to the bus system. In addition examples, a communications unit includes one or more devices used to transmit and receive data, such as a modem or a network adapter. Further, a memory is, for example, the memory 218 or a cache such as found in an interface and memory controller hub that can be present in the communications fabric 214.

Computer program code for carrying out operations for aspects of the subject disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
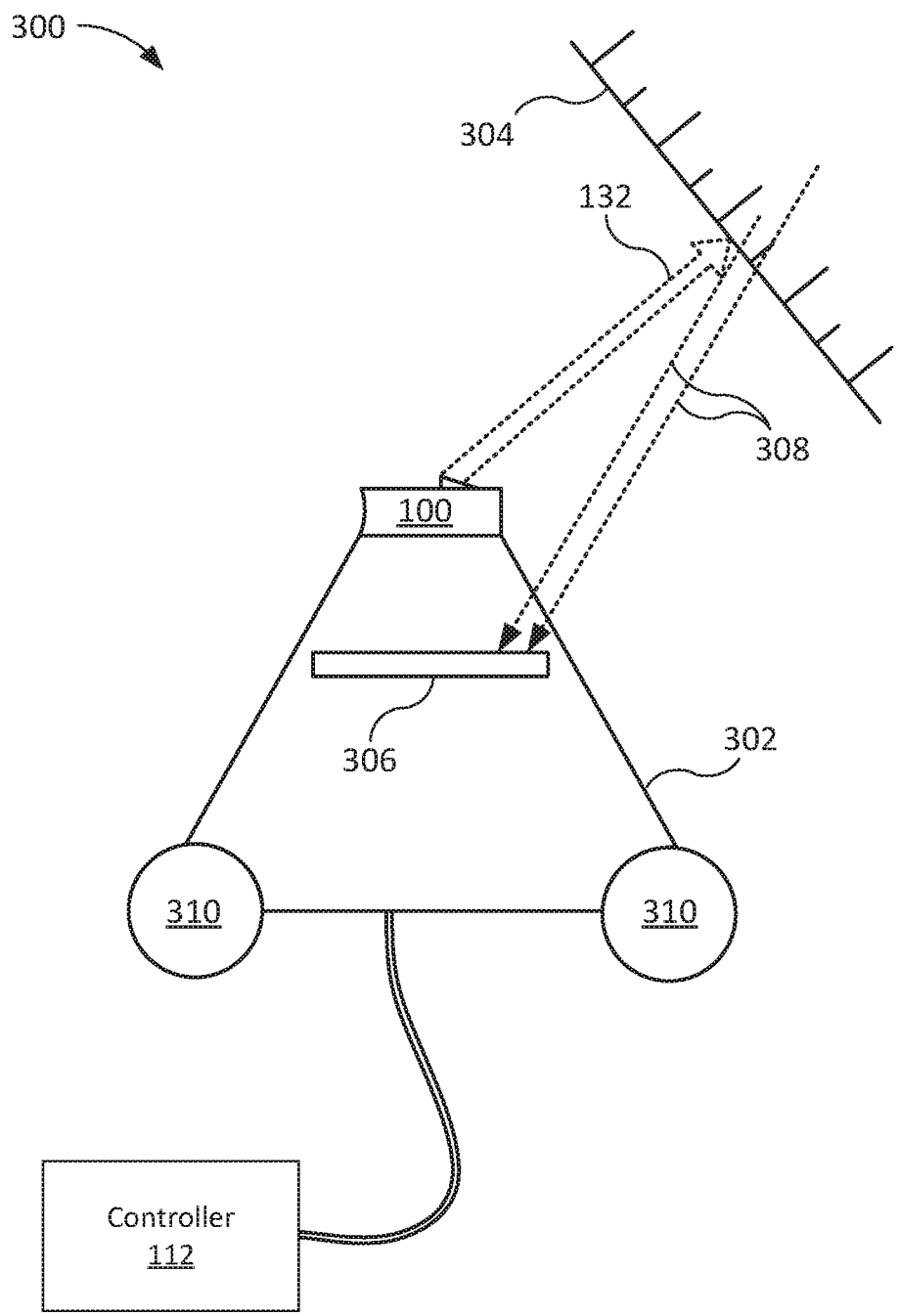
FIG. 4 is a schematic block diagram of an x-ray backscatter system, according to examples of the subject disclosure.

Referring to FIG. 4, shown is a schematic block diagram of an x-ray backscatter inspection system 300, according to examples of the subject disclosure. The inspection system 300 includes the x-ray emitter 100 to produce an x-ray beam 132 through the x-ray shield (not shown here), and a base 302.

The x-ray emitter 100, in certain examples is coupled to the base 302. The x-ray emitter 100 projects an x-ray emission 132 onto an object 304 or other target. As shown in the depicted example, the portion of the x-ray emission passed by the x-ray shield 102 emission aperture 106 is a relatively small percentage of the x-ray stream generated by the x-ray emitter 100. Previous x-ray emitters lose a substantial amount of power and x-ray emission because of the distance between an anode and a shield that is external to the vacuum tube. Beneficially, however, the proximity of the x-ray shield 102 to the anode 108 results in a much lower power requirement for the x-ray emitter 100 to emit the same intensity x-ray beam 132 as the previous x-ray emitters. In certain examples, the x-ray stream has an energy level between approximately 60 keV and 220 keV.

In certain examples, the system 300 includes a detector 306 coupled to the base 302. The detector 306 is positioned to receive backscattered x-rays 308 from the object 304 during inspection. The inspection system 300, in certain examples, includes multiple detectors 306. In some implementations, the detector 306 is shielded from x-rays that are reflected or refracted from the x-ray emitter 100. The detector 306 is positionable relative to the base 302 to improve the detection of backscattered x-rays, to reduce image noise from non-backscattered x-rays, or accommodate an inspection constraint.

In certain examples, a signal, which corresponds with the detected backscattered x-rays 308, is sent from the detector 306 to the controller 112. Additional signals are generated at the detector 306 and sent to the controller 112. The controller 112 interprets the signals to generate an image or other inspection results. The controller 112 also provides signals to control the generation of x-rays by the x-ray emitter 100, movement of the base 302 relative to the object 304, control of a cooling system (if needed) or power source, or monitoring of a system or individual component state via sensors or other devices. The controller 112, in certain examples, maintains a connection to the system 300 which is wired or wireless. In the depicted implementation, the controller 112 is separate from the inspection system 300. In some examples, the controller 112 is coupled to the base 302 or otherwise integrated into the inspection system 300.

In certain examples, the base 302 is moveable. The base 302 includes a mobility system 310 such as wheels. Other examples of a mobility system include, but are not limited to, a tread, a skid, a track, a roller, a cable, a pulley, a magnet, a motor, a slide, a bearing, etc.

Figure 5:
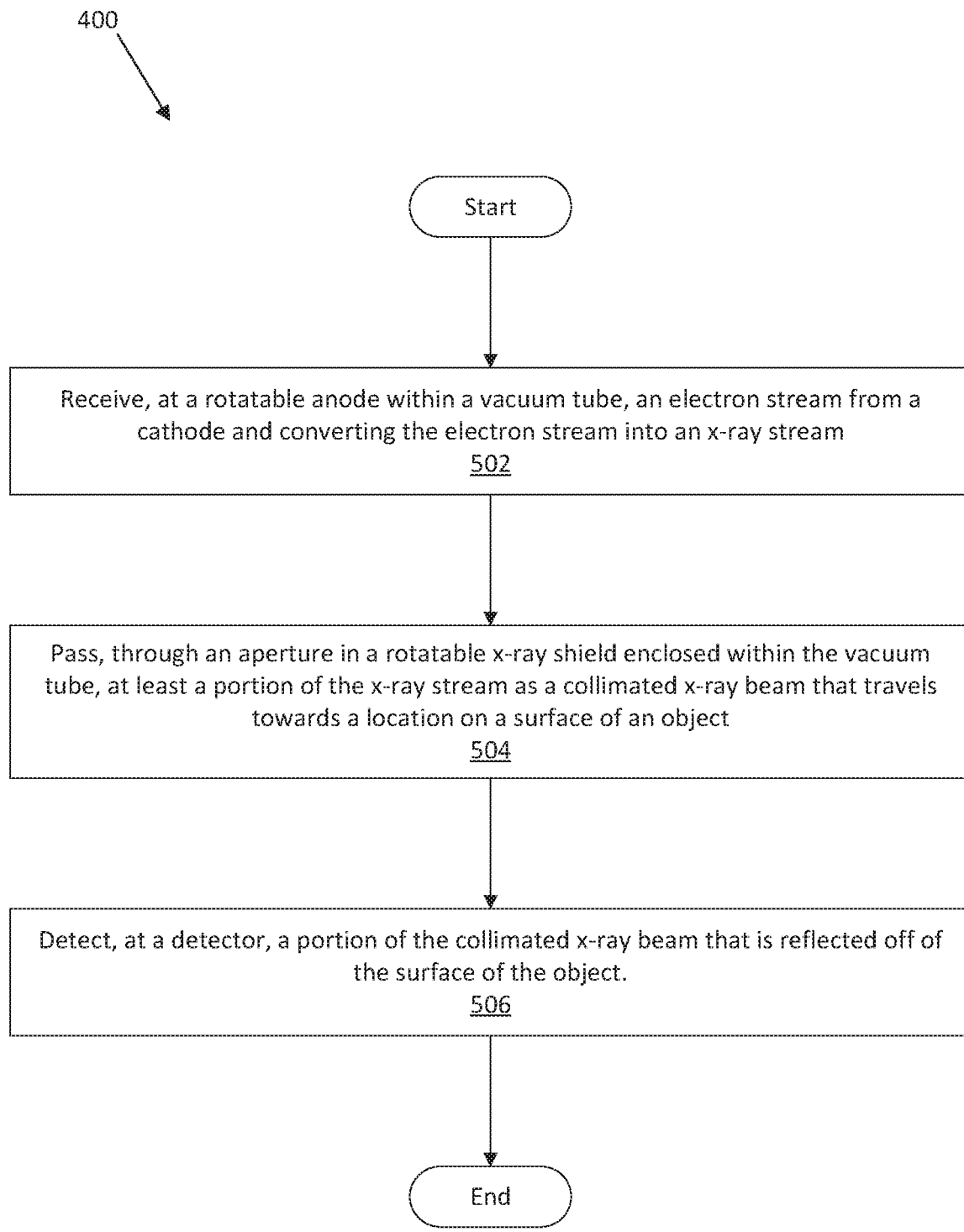
FIG. 5 is a schematic flow diagram of a method of non-destructive inspection of a part by x-ray backscatter, according to examples of the subject disclosure.

Referring to FIG. 5, a method 400 of non-destructive inspection of a part or object by x-ray backscatter is shown. The method 400 starts at block 502 and includes receiving, at a rotatable anode within a vacuum tube, an electron stream from a cathode and converting the electron stream into an x-ray stream.

At block 504, the method 400 includes passing, through an aperture in a rotatable x-ray shield enclosed within the vacuum tube, at least a portion of the x-ray stream as a collimated x-ray beam that travels towards a location on a surface of an object. At block 506, the method 400 includes detecting, at a detector, a portion of the collimated x-ray beam that is reflected off of the surface of the object.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. n enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An x-ray backscatter apparatus for non-destructive inspection of an object, the x-ray backscatter apparatus comprising:
   an x-ray emitter, comprising:
      a vacuum tube;
      an x-ray shield enclosed within the vacuum tube, wherein the x-ray shield comprises at least one emission aperture and is rotatable relative to the vacuum tube;
      a cathode enclosed within the vacuum tube and selectively operable to generate an electron stream;
      an anode, enclosed within the vacuum tube and located relative to the cathode, to receive the electron stream and convert the electron stream from the cathode to an x-ray stream, and located relative to the at least one emission aperture to direct at least a portion of the x-ray stream through the at least one emission aperture; and
      a rotatable anode shaft, wherein the anode is co-rotatably coupled to the rotatable anode shaft and is rotatable about an axis.

2. The x-ray backscatter apparatus of claim 1, wherein:
   the x-ray shield comprises a partial cylinder shape having a first end and a second end;
   the partial cylinder shape is disposed around the anode; and
   the first end comprises an opening for receiving the electron stream from the cathode.

3. The x-ray backscatter apparatus of claim 2, wherein the x-ray shield is coupled to the rotatable anode shaft.

4. The x-ray backscatter apparatus of claim 3, wherein the x-ray shield and the anode are co-rotatable about an axis.

5. The x-ray backscatter apparatus of claim 3, wherein the x-ray shield is rotatable about an axis at a first speed and the anode is rotatable about the axis at a second speed.

6. The x-ray backscatter apparatus of claim 5, further comprising a controller configured to control a first motor to rotate the x-ray shield at the first speed and control a second motor to rotate the anode at the second speed.

7. The x-ray backscatter apparatus of claim 2, wherein the x-ray shield is thermally coupled to the anode and configured to absorb heat directly from the anode.

8. The x-ray backscatter apparatus of claim 1, wherein:
   the at least the portion of the x-ray stream that passes through the at least one emission aperture is a collimated x-ray beam that travels towards a location on a surface of the object; and
   a portion of the collimated x-ray beam is reflected off of the surface of the object and detected by a detector.

9. The x-ray backscatter apparatus according to claim 1, wherein the x-ray stream has an energy level between approximately 60 keV and approximately 220 keV.

10. The x-ray backscatter apparatus of claim 1, wherein the x-ray shield and the anode are rotatable about the same axis.

11. An x-ray backscatter inspection system for non-destructive inspection of a part, the x-ray backscatter system comprising:
    a base;
    an x-ray emitter coupled to the base, the x-ray emitter comprising:
       a rotatable anode; and
       a rotatable x-ray shield enclosed within a vacuum tube and rotatable relative to the vacuum tube, wherein the rotatable x-ray shield comprises at least one emission aperture and is disposed around a rotatable anode; and
    a detector coupled to the base, the detector configured to detect at least a portion of x-ray beams from the x-ray emitter that pass through the at least one emission aperture and reflect off of a surface of an object.

12. The x-ray backscatter inspection system of claim 11, wherein the rotatable x-ray shield is thermally coupled to the rotatable anode and configured to directly absorb heat from the rotatable anode.

13. The x-ray backscatter inspection system of claim 11, wherein the base comprises a mobility system operable to move the base relative to the object.

14. The x-ray backscatter inspection system of claim 13, wherein the mobility system comprises one or more of a wheel, a tread, a skid, a track, a roller, a cable, a pulley, a magnet, a motor, a slide, and a bearing.

15. The x-ray backscatter inspection system of claim 11, wherein:
the rotatable x-ray shield comprises a partial cylinder shape having a first end and a second end;
the partial cylinder shape is disposed around the rotatable anode; and
the first end comprises an opening for receiving an electron stream from a cathode enclosed within the vacuum tube.

16. The x-ray backscatter inspection system of claim 11, wherein the rotatable x-ray shield and the rotatable anode are co-rotatable about an axis.

17. The x-ray backscatter inspection system of claim 11, wherein the rotatable x-ray shield is rotatable about an axis at a first speed and the rotatable anode is rotatable about the axis at a second speed.

18. A method of non-destructive inspection of a part by x-ray backscatter, the method comprising:
receiving, at a rotatable anode within a vacuum tube, an electron stream from a cathode and converting the electron stream into an x-ray stream;
passing, through an aperture in a rotatable x-ray shield enclosed within the vacuum tube and when the rotatable x-ray shield is rotating relative to the vacuum tube, at least a portion of the x-ray stream as a collimated x-ray beam that travels towards a location on a surface of an object; and
detecting, at a detector, a portion of the collimated x-ray beam that is reflected off of the surface of the object.

19. The method of claim 18, further comprising co-rotating the rotatable anode and the rotatable x-ray shield.

20. The method of claim 18, further comprising rotating the rotatable x-ray shield at a first speed and the rotatable anode at a second speed.

* * * * *